United States Patent
Hogan et al.

(10) Patent No.: US 9,912,143 B1
(45) Date of Patent: Mar. 6, 2018

(54) HOT STANDBY FOR LAMP DRIVER

(71) Applicant: Siemens Industry, Inc., Alpharetta, GA (US)

(72) Inventors: Brian Joseph Hogan, Temecula, CA (US); Holger Schmidt, Saint Johns, FL (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 15/442,766

(22) Filed: Feb. 27, 2017

(51) Int. Cl.
*H05B 37/00* (2006.01)
*H05B 41/00* (2006.01)
*H02H 3/05* (2006.01)
*H05B 37/02* (2006.01)

(52) U.S. Cl.
CPC ........... *H02H 3/05* (2013.01); *H05B 37/0209* (2013.01)

(58) Field of Classification Search
None
See application file for complete search history.

(56) References Cited

U.S. PATENT DOCUMENTS

| | | | | |
|---|---|---|---|---|
| 4,376,909 A | * | 3/1983 | Tagami | B60Q 1/1423 315/82 |
| 5,923,549 A | * | 7/1999 | Kobayashi | H02M 7/4807 363/17 |
| 2013/0162148 A1 | * | 6/2013 | Huang | H05B 33/0806 315/158 |
| 2014/0246987 A1 | * | 9/2014 | Hua | H05B 33/0887 315/205 |

* cited by examiner

*Primary Examiner* — Anh Tran

(57) ABSTRACT

A lamp control system may include a plurality of parallel lamp modules. Each parallel lamp module may include control electronics configured to selectively couple a DC power source with a load to selectively drive the load. The lamp control system may include at least one control circuit configured to send a same control command to the control electronics of each of the parallel lamp modules at the same time so that each of the control electronics is configured to selectively drive the load identically. The lamp control system may include at least one relay configured to selectively couple one of the parallel lamp modules with the load and decouple each of the remaining parallel lamp modules from the load so that the control electronics of the one parallel lamp module selectively drive the load according to the control command.

18 Claims, 4 Drawing Sheets

HOT STANDBY FOR LAMP DRIVER

BACKGROUND

Lamps are used in many railway applications. Lamps are driven by circuitry on lamp driver cards. In wayside signals, lamp driver cards are connected directly to equipment outside protected signal bungalow power rails (i.e., possibly unprotected equipment like lamps mounted outdoors) and therefore are susceptible to lightning and other sources for over-voltage. This creates a single point of failure for the signaling control equipment in a wayside location. Accordingly, current implementations of DC lamp drivers need external vital relays or diodes to provide backup or standby lighting. This requires external equipment such as vital relays, diodes, and special logic to make sure only one lighting system is online.

DETAILED DESCRIPTION OF SEVERAL EMBODIMENTS

DC lamp driver cards may control lighting of a traffic signal lamp or light emitting diode (LED) located on a wayside of a railway system. The systems and methods described herein may provide a selectively redundant DC lamp driver. For example, two (or more) DC lamp driver cards may be connected to the same signal. The two cards may reside in the same chassis or in separate chassis. Each card may be powered (hot), but only one of the cards may be connected to the load (e.g., one or more lamps) at any given time. Standby logic and/or one or more relays may select and switch which card is connected to the load. Accordingly, the disclosed systems and methods may provide redundant lamp drivers for DC systems, wherein a backup driver may be immediately available when an active driver stops working. For example, the backup driver may automatically start controlling the load in the event of active driver failure or to allow maintenance to or replacement of the active driver.

Figure 1:
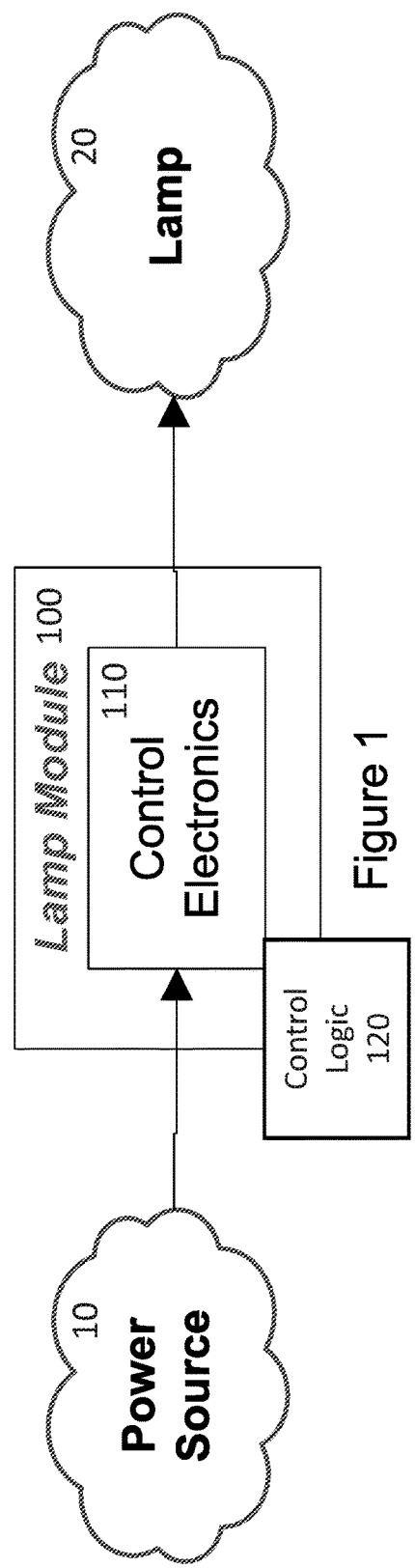
FIG. 1 is a block diagram of a lamp module according to an embodiment of the invention.

FIG. 1 is a block diagram of a lamp module 100 according to an embodiment of the invention. Lamp module 100 may control the application of power from power source 10 to one or more loads such as lamp 20. Power source 10 may be a DC power source. In some embodiments, power source 10 may supply 12V, 24V, 48V, or 60V DC power. In some embodiments, lamp module 100 may be configured to accept power from power sources 10 ranging from a limited voltage 12V DC (9.5V DC to 16.6 VDC) to an extended operating voltage 9.5V to 60V DC having a 2.5 A current rating. Lamp 20 may be any illumination device configured to operate on DC power. For example, in some embodiments, lamp 20 may include an 18 W-25 W LED. Lamp module 100 may apply power from any number of power sources 10 to any number of lamps 20.

Lamp module 100 may include control electronics 110. Control electronics 110 may include semiconductor devices such as Field Effect Transistors (FETs). One or more semiconductor devices may be used as a semiconductor switch or a relay to receive power from power source 10 and turn ON or OFF lamp 20. Lamp module 100 may apply power to lamp 20 as directed by logic, either on lamp module 100 itself or as directed by another device such as a logic processing module 120. In some embodiments, the logic may be incorporated into control electronics 110, for example.

In some embodiments, systems configured to supply power to lamps 20 may include two or more lamp modules 100. Multiple lamp modules 100 in a single system may provide redundancy. For example, a first lamp module 100 may actively control the supply of power to lamp 20, while a second lamp module 100 provides a standby capability in the event the first lamp module 100 malfunctions or otherwise goes offline. In order to provide this redundant capability, a relay may interface lamp module 100 outputs to lamp 20 load such that only a single lamp module 100 output is attached to lamp 20 load at one time. Relays may be internal to lamp modules 100 or external to lamp modules 100.

Figure 2:
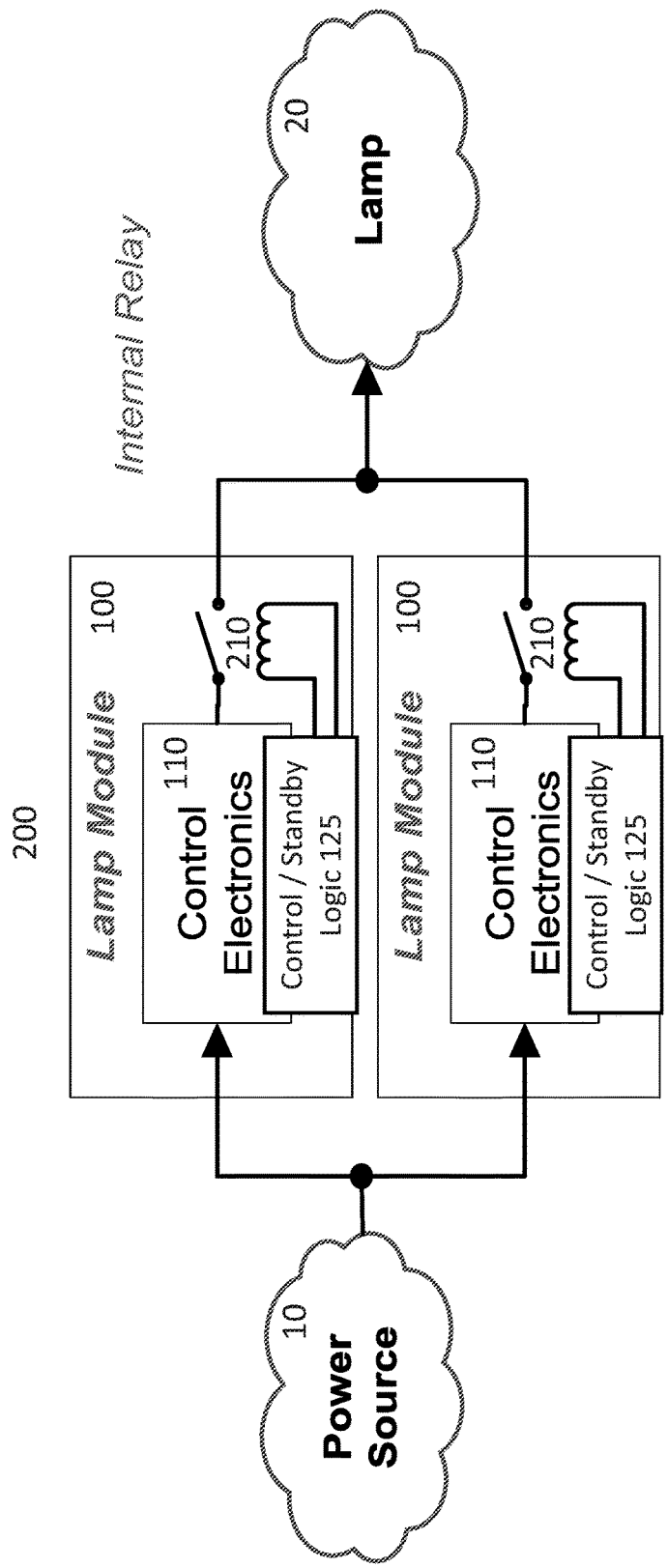
FIG. 2 is a block diagram of a system including multiple parallel lamp modules with internal relays according to an embodiment of the invention.

FIG. 2 is a block diagram of a system 200 including multiple parallel lamp modules 100 with internal relays 210 according to an embodiment of the invention. Two lamp modules 100 are illustrated in this example, but system 200 may include any plural number of lamp modules 100. In some embodiments, the separate lamp modules 100 may be physically separate elements (e.g., separate boards). In some embodiments, the separate lamp modules 100 may be subsets of the same physical element (e.g., separate circuits on a single board, such as a single lamp module that includes multiple channels (e.g., 6 or 8 or 16 channels)).

Each lamp module 100 may include control electronics 110. Control electronics 110 of each lamp module 100 may be coupled to power source 10. Each lamp module 100 may include its own internal relay 210 configured to selectively couple control electronics 110 to lamp 20. Control electronics 110 may include one or more relays, switches, or other elements configured to selectively close a circuit between power source 10 and internal relay 210. Thus, control electronics 110 may be configured to selectively turn lamp 20 ON or OFF if internal relay 210 is closed.

Each lamp module 100 may include logic processing module including standby logic (control/standby logic processing module 125). In some embodiments, logic processing module 125 may be a single logic circuit (e.g., a processor or the like), and in other embodiments, logic processing module 125 may include multiple logic circuits. For example, logic processing module 125 may include separate control logic and standby logic. Also, while each lamp module 100 has its own logic processing module 125 in the example of FIG. 2, in some embodiments a single logic processing module 125 may control all lamp modules 100 in system 200. Logic processing module 125 may direct control electronics 110 to receive power from power source 10 and turn ON or OFF lamp 20. In some embodiments, logic processing module 125 may receive external commands to turn lamp 20 ON or OFF. For example, logic processing module 125 may communicate with other elements of a train control system and, based on information from the train control system, cause lamp 20 to turn ON or OFF to communicate information to a train operator.

Control electronics 110 in each lamp module 100 may be controlled simultaneously by logic processing modules 125 in an identical fashion. For example, all control electronics 110 in system 200 may be directed to receive power from power source 10 and turn lamp 20 ON, or all control electronics 110 in system 200 may be directed to refrain from supplying power from power source 10 to lamp 20 to turn lamp 20 OFF. Accordingly, any of plural lamp modules 100 may be used to control lamp 20 at any time, because control electronics 110 of each lamp module 100 control lamp module 100 output identically.

Accordingly, internal relays 210 may connect any of plural lamp modules 100 to lamp 20 at any given time. For example, a first lamp module 100 may be an active module, and its internal relay 210 may close. All other lamp modules 100 may be standby modules, and their internal relays 210 may open. Any standby lamp module 100 may be switched to operate as the active lamp module 100 at any time. To make a given standby lamp module 100 act as the active lamp module 100, logic processing module 125 configured to control the given standby lamp module 100 may control internal relay 210 of the given standby lamp module 100 to close. In some embodiments, only one lamp module 100 may be active at any given time, so logic processing module 125 configured to control other lamp modules 100 may control internal relays 210 of the other lamp modules 100 to open at the same time.

Logic processing module 125 may designate a lamp module 100 as active and close its internal relay 210 selectively. In some embodiments, logic processing module 125 may automatically designate a new active lamp module 100 upon failure of a current active lamp module 100. For example, logic processing module 125 may include feedback to determine whether control electronics 110 have responded to a command from logic processing module 125 to turn lamp 20 ON or OFF. In some embodiments, logic processing module 125 may include feedback circuitry comprising current measurement circuitry and/or voltage measurement circuitry configured to detect a signal at lamp 20 itself and/or to perform a cold/hot filament detection. In some embodiments, logic processing module 125 may include feedback circuitry comprising circuitry for detecting malfunctions related to voltage regulation and over current limit.

If logic processing module 125 determines that control electronics 110 are not responding to commands or otherwise designates a new active lamp module 100, logic processing module 125 may direct internal relay 210 to open. Logic processing module 125 configured to control a standby lamp module 100 may control internal relay 210 of the standby lamp module 100 to close, and the standby lamp module 100 may become the active lamp module 100. The malfunctioning former active lamp module 100 may now be disconnected from lamp 20 and may be serviced, for example. Because each lamp module 100 in system 200 may issue the same commands to their respective control electronics 110, a standby lamp module 100 may instantly control lamp 20 to the correct state (e.g., ON or OFF) as soon as the standby lamp module 100 becomes active through closure of its internal relay 210.

Figure 3:
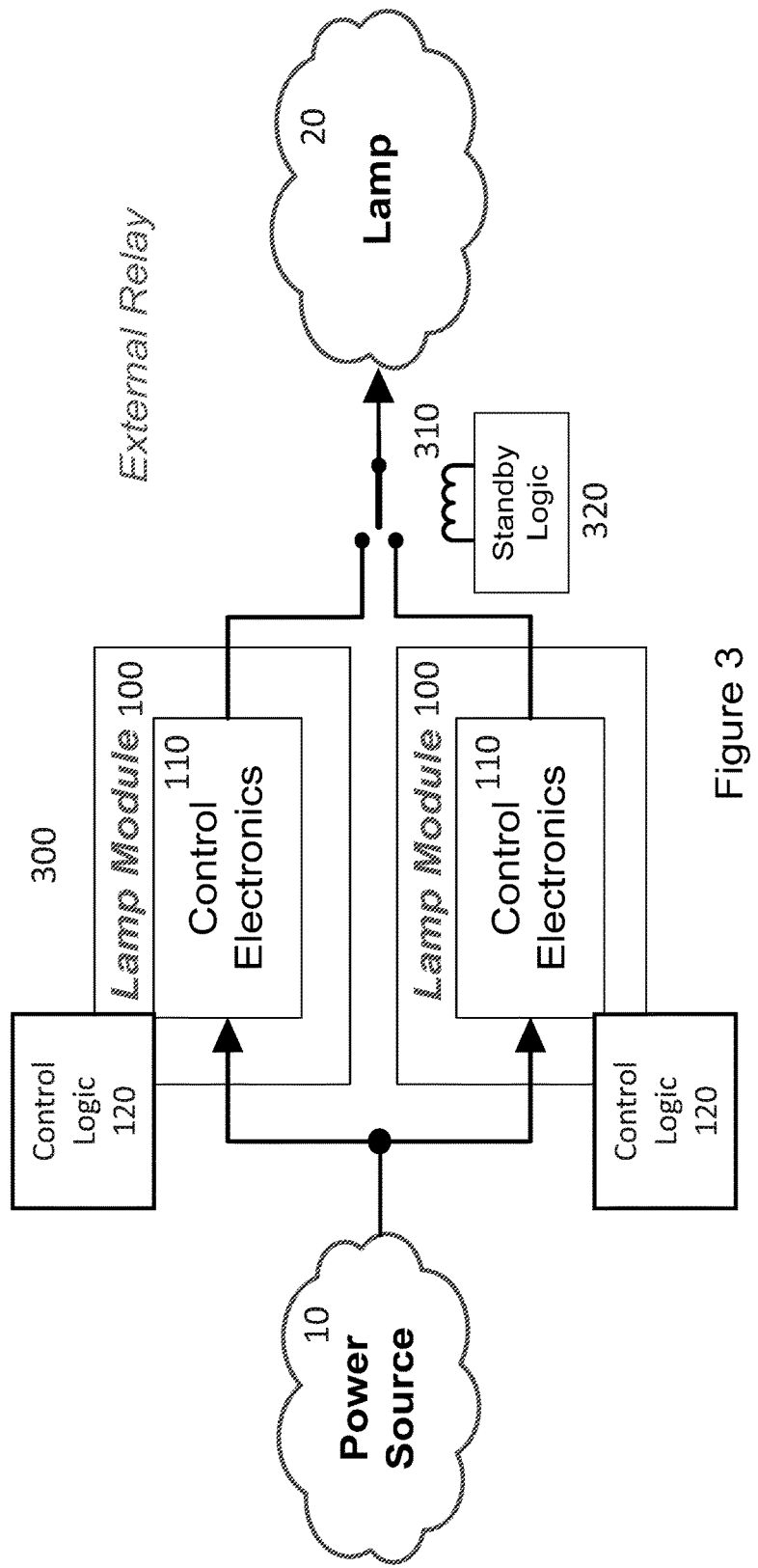
FIG. 3 is a block diagram of a system including multiple parallel lamp modules with an external relay according to an embodiment of the invention.

FIG. 3 is a block diagram of a system 300 including multiple parallel lamp modules 100 with an external relay 310 according to an embodiment of the invention. Two lamp modules 100 are illustrated in this example, but system 300 may include any plural number of lamp modules 100. In some embodiments, the separate lamp modules 100 may be physically separate elements (e.g., separate boards). In some embodiments, the separate lamp modules 100 may be subsets of the same physical element (e.g., separate circuits on a single board, such as a single lamp module that includes multiple channels (e.g., 6 or 8 or 16 channels)).

Each lamp module 100 may include control electronics 110. Control electronics 110 of each lamp module 100 may be coupled to power source 10. External relay 310 may be configured to selectively couple control electronics 110 of each lamp module 100 to lamp 20. Control electronics 110 may include one or more relays, switches, or other elements configured to selectively close a circuit between power source 10 and external relay 310. Thus, control electronics 110 may be configured to selectively turn lamp 20 ON or OFF if external relay 310 has closed the circuit between control electronics 110 and lamp 20. System 300 may include standby logic 320 configured to control external relay 310 to select an active lamp module 100 and connect its control electronics 110 to lamp 20. External relay 310 may be configured so that control electronics 110 of only a single lamp module 100 may be connected to lamp 20 at any given time.

Each lamp module 100 may include logic processing module 120. In some embodiments, logic processing module 120 may be a single logic circuit (e.g., a processor or the like), and in other embodiments, logic processing module 120 may include multiple logic circuits. Also, while each lamp module 100 has its own logic processing module 120 in the example of FIG. 3, in some embodiments a single logic processing module 120 may control all lamp modules 100 in system 300. Logic processing module 120 may direct control electronics 110 to receive power from power source 10 and turn ON or OFF lamp 20. In some embodiments, logic processing module 120 may receive external commands to turn lamp 20 ON or OFF. For example, logic processing module 120 may communicate with other elements of a train control system and, based on information from the train control system, cause lamp 20 to turn ON or OFF to communicate information to a train operator.

Control electronics 110 in each lamp module 100 may be controlled simultaneously by logic processing modules 120 in an identical fashion. For example, all control electronics 110 in system 300 may be directed to receive power from power source 10 and lamp 20 ON, or all control electronics 110 in system 300 may be directed to refrain from supplying power from power source 10 to lamp 20 to turn lamp 20 OFF. Accordingly, any of plural lamp modules 100 may be used to control lamp 20 at any time, because control electronics 110 of each lamp module 100 control lamp module 100 output identically.

Accordingly, external relay 310 may connect any of plural lamp modules 100 to lamp 20 at any given time. For example, a first lamp module 100 may be an active module, external relay 310 may close a connection between control electronics 110 of the first lamp module 100 and lamp 20. All other lamp modules 100 may be standby modules, and external relay 310 may open connections between control electronics 110 of the other lamp modules 100 and lamp 20. Any standby lamp module 100 may be switched to operate as the active lamp module 100 at any time. To make a given standby lamp module 100 act as the active lamp module 100, standby logic module 320 may control external relay 310 to close the connection between the given standby lamp module 100 and lamp 20. As external relay 310 may be configured to connect only one lamp module 110 to lamp 20 at once, this same control may cause external relay 310 to open the connection between the previously active lamp module 100 and lamp 20.

Standby logic module 320 may designate a lamp module 100 as active and close external relay 310 selectively to connect the designated lamp module 100 with lamp 20. In some embodiments, standby logic module 320 may automatically designate a new active lamp module 100 upon failure of a current active lamp module 100. For example, standby logic module 320 and/or logic processing module 120 may include feedback to determine whether control electronics 110 have responded to a command from logic processing module 120 to turn lamp 20 ON or OFF. In some embodiments, logic processing module 125 may include feedback circuitry comprising current measurement circuitry and/or voltage measurement circuitry configured to detect a signal at lamp 20 itself and/or to perform a cold/hot filament detection. In some embodiments, logic processing module 125 may include feedback circuitry comprising circuitry for detecting malfunctions related to voltage regulation and over current limit.

If standby logic module 320 and/or logic processing module 120 determines that control electronics 110 are not responding to commands or otherwise designates a new active lamp module 100, standby logic module 320 may direct external relay 310 to select a standby lamp module 100 to connect to lamp 20. The standby lamp module 100 may become the active lamp module 100. The malfunctioning former active lamp module 100 may now be disconnected from lamp 20 and may be serviced, for example. Because each lamp module 100 in system 200 may issue the same commands to their respective control electronics 110, a standby lamp module 100 may instantly control lamp 20 to the correct state (e.g., ON or OFF) as soon as the standby lamp module 100 becomes active through selection by external relay 310.

Figure 4:
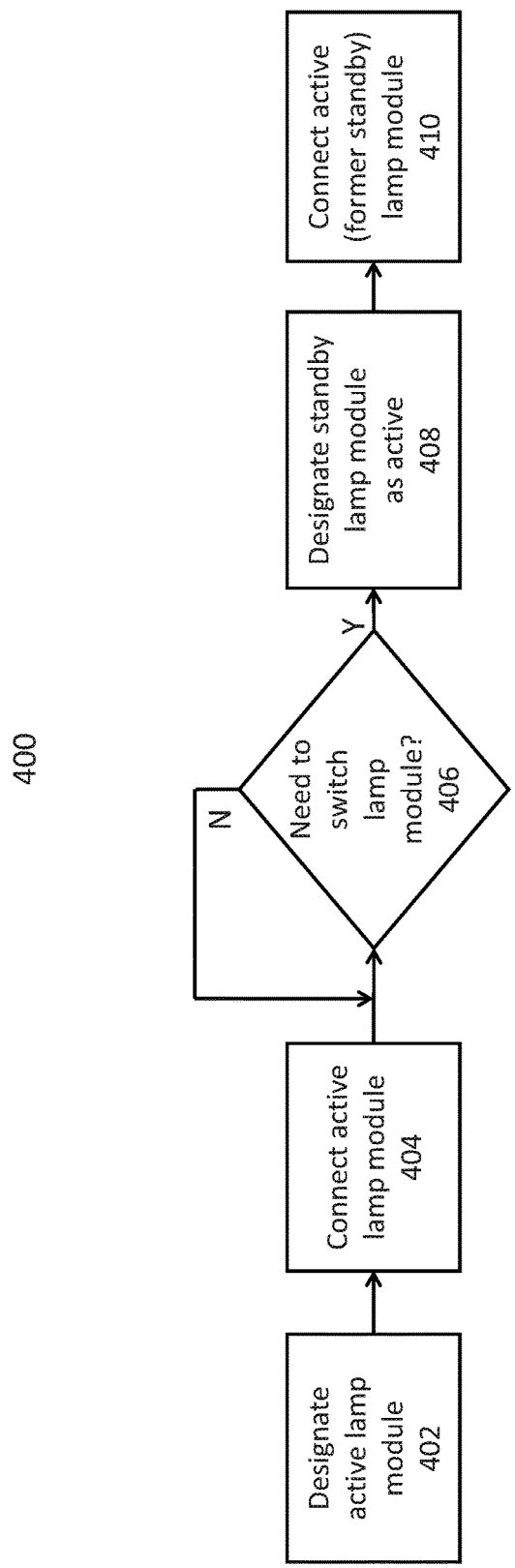
FIG. 4 is a flow diagram of an active lamp module selection process according to an embodiment of the invention.

FIG. 4 is a flow diagram of an active lamp module selection process 400 according to an embodiment of the invention. System 200 of FIG. 2 and/or system 300 of FIG. 3 may use selection process 400 to select an active lamp module 100. Logic processing module 125 of FIG. 2 or standby logic module 320 and/or logic processing module 120 of FIG. 3 may perform selection process 400. For ease of explanation, these processing modules, or combinations thereof, are generically referred to as control logic in the description of selection process 400.

At 402, control logic may designate one of the plurality of lamp modules 100 as the active module. Accordingly, all other lamp modules 100 in the system may be standby modules, as only one module may be active at a given time.

At 404, control logic may connect control electronics 110 of the active lamp module 100 to lamp 20. For example, for internal relay systems 200, control logic may control internal relay 210 of the active lamp module 100 to close. For external relay systems 300, control logic may control external relay 310 to connect active lamp module 100 to lamp 20.

At 406, control logic may determine whether there is a problem with the active lamp module 100 or there is otherwise a need to switch lamp modules 100. For example, control logic may determine that active lamp module 100 is malfunctioning as described above. In some embodiments, control logic may receive a command indicating selection of a different, currently standby lamp module 100 as a new active lamp module 100.

At 408, in response to determining that a current standby lamp module 100 is to be designated as a new active lamp module 100, control logic may designate the standby lamp module 100 as the active module.

At 410, control logic may connect control electronics 110 of the newly designated active lamp module 100 to lamp 20. For example, for internal relay systems 200, control logic may control internal relay 210 of the active lamp module 100 to close. For external relay systems 300, control logic may control external relay 310 to connect active lamp module 100 to lamp 20. Accordingly, the former active lamp module 100 may be disconnected from lamp 20, as discussed above.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A lamp control system comprising:
   a plurality of parallel lamp modules, each parallel lamp module comprising control electronics configured to selectively couple a DC power source with a load to selectively drive the load;
   a separate control circuit for each parallel lamp module, each control circuit being configurable to send a same control command to the control electronics of each of the parallel lamp modules at the same time so that each of the control electronics is configured to selectively drive the load identically; and
   at least one relay configured to selectively couple one of the parallel lamp modules with the load and decouple each of the remaining parallel lamp modules from the load so that the control electronics of the one parallel lamp module selectively drive the load according to the control command.

2. The lamp control system of claim 1, wherein each control circuit is further configured to control the at least one relay to selectively couple the one parallel lamp module with the load and decouple each of the remaining parallel lamp modules from the load.

3. The lamp control system of claim 1, wherein each control circuit is further configured to:
   detect a malfunction associated with the one parallel lamp module coupled with the load; and
   in response to detecting the malfunction, decouple the one parallel lamp module from the load and couple one of the remaining parallel lamp modules with the load.

4. The lamp control system of claim 1, wherein the at least one relay comprises a separate relay for each parallel lamp module.

5. The lamp control system of claim 4, wherein each separate relay is an internal relay within each respective parallel lamp module.

6. A lamp control system comprising:
a plurality of parallel lamp modules, each parallel lamp module comprising control electronics configured to selectively couple a DC power source with a load to selectively drive the load;
at least one control circuit configured to send a same control command to the control electronics of each of the parallel lamp modules at the same time so that each of the control electronics is configured to selectively drive the load identically; and
at least one relay configured to selectively couple one of the parallel lamp modules with the load and decouple each of the remaining parallel lamp modules from the load so that the control electronics of the one parallel lamp module selectively drive the load according to the control command; and
at least one standby logic circuit configured to control the at least one relay to selectively couple the one parallel lamp module with the load and decouple each of the remaining parallel lamp modules from the load.

7. The lamp control system of claim 6, wherein the at least one standby logic circuit is further configured to:
detect a malfunction associated with the one parallel lamp module coupled with the load; and
in response to detecting the malfunction, decouple the one parallel lamp module from the load and couple one of the remaining parallel lamp modules with the load.

8. The lamp control system of claim 1, wherein the at least one relay comprises at least one external relay coupled to each parallel lamp module and configured to selectively couple a single one of the parallel lamp modules with the load at a given time.

9. A lamp system comprising:
the lamp control system of claim 1;
the DC power source; and
the load.

10. The lamp system of claim 9, wherein the load comprises at least one lamp.

11. A method for controlling a lamp, the method comprising:
sending a same control command to control electronics of each of a plurality of parallel lamp modules at the same time, by a separate control circuit for each parallel lamp module, so that each of the control electronics is configured to selectively drive a load identically, wherein each of the control electronics is configured to selectively couple a DC power source with the load to selectively drive the load; and
selectively coupling, by at least one relay, one of the parallel lamp modules with the load and decoupling each of the remaining parallel lamp modules from the load so that the control electronics of the one parallel lamp module selectively drive the load according to the control command.

12. The method of claim 11, further comprising controlling, by the separate control circuit for each parallel lamp module, the at least one relay to selectively couple the one parallel lamp module with the load and decouple each of the remaining parallel lamp modules from the load.

13. The method of claim 11, further comprising:
detecting, by the separate control circuit for each parallel lamp module, a malfunction associated with the one parallel lamp module coupled with the load; and
in response to detecting the malfunction, decoupling, by the separate control circuit for each parallel lamp module, the one parallel lamp module from the load and couple one of the remaining parallel lamp modules with the load.

14. The method of claim 11, wherein the at least one relay comprises a separate relay for each parallel lamp module.

15. The method of claim 11, further comprising controlling, by at least one standby logic circuit, the at least one relay to selectively couple the one parallel lamp module with the load and decouple each of the remaining parallel lamp modules from the load.

16. The method of claim 15, wherein each separate relay is an internal relay within each respective parallel lamp module.

17. The method of claim 11, wherein the at least one relay comprises at least one external relay coupled to each parallel lamp module and configured to selectively couple a single one of the parallel lamp modules with the load at a given time.

18. The method of claim 17, further comprising:
detecting, by the at least one standby logic circuit, a malfunction associated with the one parallel lamp module coupled with the load; and
in response to detecting the malfunction, decoupling, by the at least one standby logic circuit, the one parallel lamp module from the load and couple one of the remaining parallel lamp modules with the load.

* * * * *